US012700243B2

(12) United States Patent (10) Patent No.: US 12,700,243 B2

Kakita et al. (45) Date of Patent: Aug. 4, 2026

(54) IMAGE PROCESSING APPARATUS

(71) Applicant: DENSO TEN Limited, Kobe (JP)

(72) Inventors: Naoshi Kakita, Kobe (JP); Takashi Kono, Kobe (JP); Yuki Matsumoto, Kobe (JP); Shota Kinoshita, Kobe (JP); Yasutaka Nishijima, Kobe (JP)

(73) Assignee: DENSO TEN Limited, Kobe (JP)

( * ) Notice: Subject to any disclaimer, the term of this patent is extended or adjusted under 35 U.S.C. 154(b) by 277 days.

(21) Appl. No.: 18/583,093

(22) Filed: Feb. 21, 2024

(65) Prior Publication Data

US 2024/0312223 A1 Sep. 19, 2024

(30) Foreign Application Priority Data

Mar. 15, 2023 (JP) ................................. 2023-040923

(51) Int. Cl.
| | |
|---|---|
| *G06K 9/00* | (2022.01) |
| *G06V 10/56* | (2022.01) |
| *G06V 10/60* | (2022.01) |
| *G06V 20/58* | (2022.01) |

(52) U.S. Cl.
CPC ............ *G06V 20/584* (2022.01); *G06V 10/56* (2022.01); *G06V 10/60* (2022.01)

(58) Field of Classification Search
CPC . G06T 2207/30236; G06T 2207/30248; G06T 2207/30252; G06T 2207/30256; G06T 2207/30261; G06T 2207/30264; G06V 20/54; G06V 20/56
See application file for complete search history.

(56) References Cited

U.S. PATENT DOCUMENTS

| | | | | |
|---|---|---|---|---|
| 2003/0138140 A1* | 7/2003 | Marcelpoil | ............ | G01N 21/31 |
| | | | | 382/128 |
| 2004/0184670 A1* | 9/2004 | Jarman | .................. | H04N 1/624 |
| | | | | 382/117 |
| 2005/0025357 A1* | 2/2005 | Landwehr | ............. | A01M 3/005 |
| | | | | 382/224 |
| 2011/0026767 A1* | 2/2011 | Miyazaki | ............. | H04N 23/611 |
| | | | | 382/103 |
| 2014/0313369 A1* | 10/2014 | Kageyama | .............. | G06T 11/10 |
| | | | | 348/223.1 |
| 2015/0294167 A1* | 10/2015 | Zhang | .................. | G06V 20/584 |
| | | | | 382/103 |
| 2017/0228606 A1* | 8/2017 | Guan | ........................ | G06T 7/90 |

(Continued)

FOREIGN PATENT DOCUMENTS

JP 2021-022134 A 2/2021

*Primary Examiner* — Avinash Yentrapati
(74) *Attorney, Agent, or Firm* — Oliff PLC

(57) ABSTRACT

An image processing apparatus that identifies a light emitting state of a traffic light having a green light, a yellow light and a red light from a camera image includes a controller configured to: (i) detect, from the camera image, each of green pixels, yellow pixels, and red pixels of the green, yellow and red lights of the traffic light; (ii) identify a light emitting region and non-light emitting regions from the green pixels, the yellow pixels and the red pixels that have been detected by comparing the detected pixels to predetermined threshold values; and (iii) determine the light emitting state of the traffic light according to results of relative comparison of luminance and saturation between the light emitting region and the non-light emitting regions that have been identified.

6 Claims, 12 Drawing Sheets

(56)  References Cited

U.S. PATENT DOCUMENTS

| | | | |
|---|---|---|---|
| 2021/0027077 A1* | 1/2021 | Hayashi | G06V 10/98 |
| 2023/0202474 A1* | 6/2023 | Lee | G06V 10/764 |
| | | | 701/96 |
| 2023/0401875 A1* | 12/2023 | Chien | G06V 10/56 |

* cited by examiner

| | Y THRESHOLD VALUE | | U THRESHOLD VALUE | | V THRESHOLD VALUE | |
|---|---|---|---|---|---|---|
| | LOWER LIMIT | UPPER LIMIT | LOWER LIMIT | UPPER LIMIT | LOWER LIMIT | UPPER LIMIT |
| GREEN COMPONENT | 64 | 255 | 96 | 160 | 0 | 112 |
| YELLOW COMPONENT | 64 | 255 | 0 | 112 | 120 | 192 |
| RED COMPONENT | 16 | 160 | 96 | 160 | 160 | 255 |
| ARROW COMPONENT | 32 | 224 | 96 | 160 | 64 | 116 |
| BLACK COMPONENT | 0 | 96 | 96 | 144 | 96 | 160 |

FIG. 8

IMAGE PROCESSING APPARATUS

BACKGROUND OF THE INVENTION

Field of the Invention

The invention relates to an image processing apparatus, an image processing method and a non-transitory computer-readable recording medium.

Description of the Background Art

Conventionally, an image processing apparatus that determines a light emitting state of a traffic light from a camera image has been proposed (for example, refer to the Japanese Published Unexamined Patent Application No. 2021-22134 (Patent Document 1)). The Patent Document 1 discloses a signal machine information management system that specifies a region of interest of the traffic light from a camera image, detects a light that is turned on and a light that is turned off from the region of interest, and determines a light emitting state of the traffic light.

However, in the technology described in the Patent Document 1, the light emitting state of the traffic light that is exposed to a strong light, such as a direct sunlight, may not be determined. Specifically, in the technology described in the Patent Document 1, although a black region is detected as the light that is turned off in the region of interest, when the traffic light is exposed to the strong light, the light that is turned off is illuminated. Thus, the light that is turned off may not be detected under detection conditions of the black region.

SUMMARY OF THE INVENTION

According to one aspect of the invention, an image processing apparatus that identifies a light emitting state of a traffic light having a green light, a yellow light and a red light from a camera image includes a controller configured to: (i) detect, from the camera image, each of green pixels, yellow pixels, and red pixels of the green, yellow and red lights of the traffic light; (ii) identify a light emitting region and non-light emitting regions from the green pixels, the yellow pixels and the red pixels that have been detected by comparing the detected pixels to predetermined threshold values; and (iii) determine the light emitting state of the traffic light according to results of relative comparison of luminance and saturation between the light emitting region and the non-light emitting regions that have been identified.

It is an object of the invention to provide an image processing apparatus, an image processing method and a non-transitory computer-readable recording medium capable of determining a light emitting state of a traffic light that is exposed to a strong light.

These and other objects, features, aspects and advantages of the invention will become more apparent from the following detailed description of the invention when taken in conjunction with the accompanying drawings.

BRIEF DESCRIPTION OF THE DRAWINGS

FIG. 8 is an explanatory diagram (No. 1) of an extraction process of a color feature amount;

DESCRIPTION OF THE EMBODIMENTS

An embodiment of an image processing apparatus, an image processing method, and a non-transitory computer-readable recording medium disclosed in the present application will be described in detail below with reference to the accompanying drawings. This invention is not limited to the embodiment described below.

In the following, it is assumed that an image processing apparatus 10 according to the embodiment is an in-vehicle apparatus to be mounted in a vehicle V illustrated in FIG. 4, etc. The image processing apparatus 10 detects an object in an image based on a camera image of a camera 3 mounted in the vehicle V, such as a device for determining whether or not a driver of a vehicle is ignoring a traffic light, or a drive recorder. In this embodiment, it is assumed that the object is a traffic light 300.

The image processing apparatus 10 is not limited to the in-vehicle apparatus, and may be a portable terminal apparatus, such as a smartphone or a personal computer, or may be a server apparatus that acquires a camera image captured by each of cameras through a network. Furthermore, the camera 3 is not limited to the drive recorder, and may include various cameras, such as a camera of the smartphone, etc., a security camera, and the like. The image processing apparatus 10 may be various wearable devices, such as an AR (Augment Reality) goggle, and the like.

Figure 1:
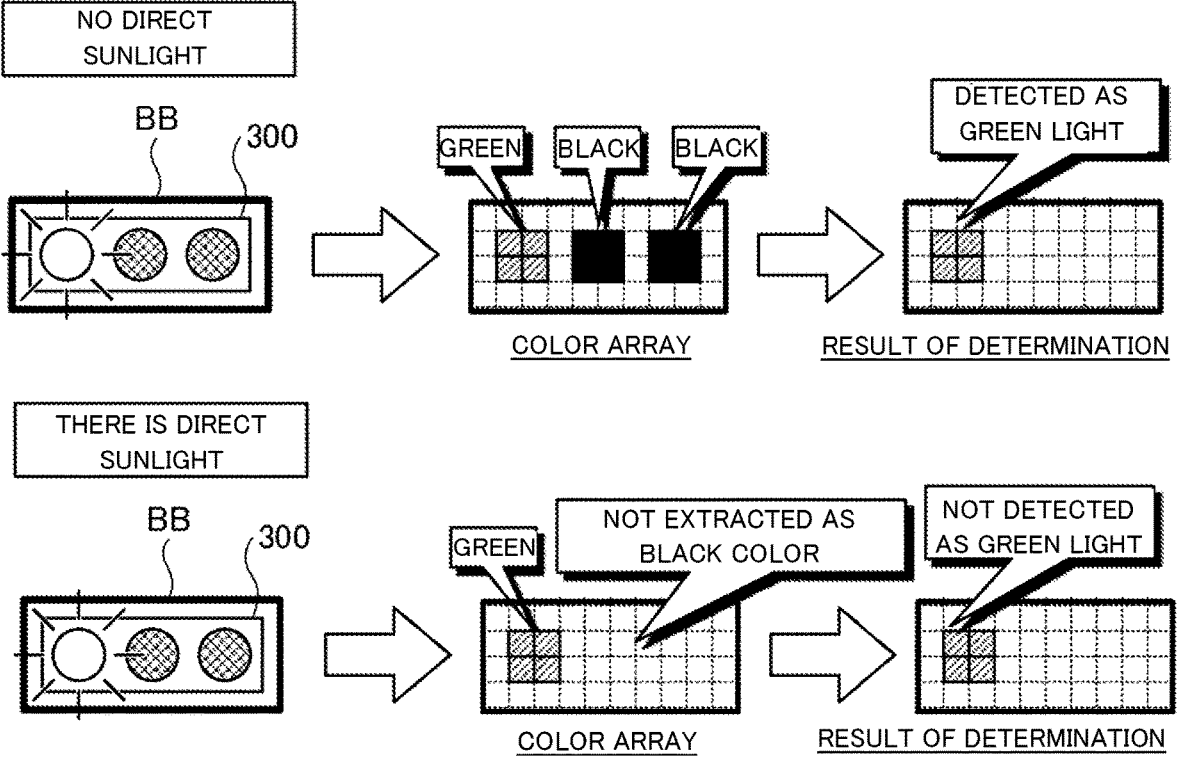
FIG. 1 is a schematic explanatory diagram of an image processing method.
Figure 2:
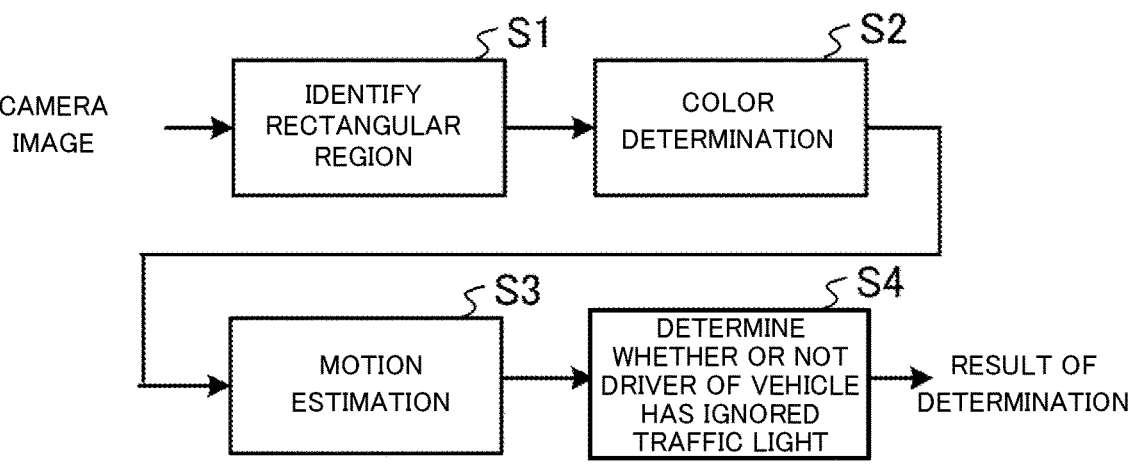
FIG. 2 illustrates a processing flow of the image processing method.

First, an outline of the image processing method according to the embodiment will be described with reference to FIG. 1 and FIG. 2. FIG. 1 is a schematic explanatory diagram of the image processing method. FIG. 2 illustrates a processing flow of the image processing method. An upper drawing of FIG. 1 shows a processing example in which the traffic light is not exposed to a direct sunlight. A lower drawing of FIG. 1 shows a processing example in which the traffic light is exposed to the direct sunlight.

As described above, when a light emitting state of the traffic light 300 is determined using the camera image of the camera 3, the traffic light 300 itself in the image needs to be detected. In such a case, the traffic light 300 to be detected is identified as a rectangular region called "bounding box", for example, using a machine learning algorithm, such as a deep learning.

In the identified rectangular region, the light emitting state of the traffic light 300 is determined by image analysis. At this time, the light emitting state of the traffic light 300 is determined based on a color array in which pixels having respective color components have been identified from the rectangular region based a threshold value. Examples of the respective color components include green, yellow, red, and black components.

At this time, the black component is used for identifying a light that is tuned off in the color array. For example, in the traffic light in which a green light is located on a left side, a yellow light in a center, and a red light on a right side, as illustrated in the upper drawing of FIG. 1, in a state in which the green light of the traffic light 300 emits light (a green light is on), the yellow light and the red light do not emit light, respectively and are identified as a black color.

Therefore, in the color array in which the traffic light 300 is the green light (when the green light emits light, and the yellow and red light are turned off), "green", "black" and "black" colors are arranged from the left. The color array is compared to an arrangement pattern of the lights of the traffic light and when both are consistent with each other, the traffic light 300 is detected as the green light.

On the other hand, as illustrated in the lower drawing of FIG. 1, when the traffic light 300 is exposed to the direct sunlight, the light that is turned off is illuminated, so that the light that is turned off may not be identified as the black color from a rectangular region BB. As a result, even when the traffic light 300 is actually the green light, the traffic light 300 is not identified as the green light due to an inconsistency between the color array and the arrangement pattern of the lights of the traffic light, and the light emitting state of the traffic light 300 is not determined. In this way, in order to generate the color array, when the black color is identified from the camera image based on a predetermined threshold value, the black color may not be identified by light intensity.

In order to solve such a problem, the image processing method according to the embodiment is a technology that determines the light emitting state of the traffic light 300 that is exposed to a strong light. Specifically, the image processing method according to the embodiment includes the steps of identifying a light emitting region and a non-light emitting region from the camera image, and determining the light emitting state of the traffic light according to results of relative comparison of luminance and saturation between the identified light emitting region and the non-light emitting region.

First, prior to a detailed explanation of the image processing method according to the embodiment, various processing flows of the camera image that are performed by a controller 12 of the image processing apparatus 10 performing the image processing method according to the embodiment will be described with reference to FIG. 2.

As illustrated in FIG. 2, the controller 12 inputs the camera image captured by the camera 3, identifies the rectangular region (a step S1), performs a color determination (a step S2), a motion estimation (a step S3) and a determination of whether or not the driver of the vehicle is ignoring the traffic light (a step S4) and outputs a result of the determination.

In the step S1, the controller 12 uses a DNN (Deep Neural Network) model, etc. learned using a machine learning algorithm, and extracts the traffic light 300 in the image as the rectangular region BB.

In the step S2, the controller 12 generates the color array, identifies the light emitting region and the non-light emitting region, and performs various processes for the light emitting region and the non-light emitting region so as to determine the light emitting state of the traffic light 300. A process for the color determination in the step S2 corresponds to a main process of the image processing method according to the embodiment.

The controller 12 estimates a motion of the vehicle V based on a trajectory of the traffic light 300 recognized by image recognition in the step S3. Furthermore, in the step S4, the controller 12 determines whether or not the driver of the vehicle V has ignored the traffic light from results of the color determination in the step S2 and the motion estimation in the step S3.

Figure 3:
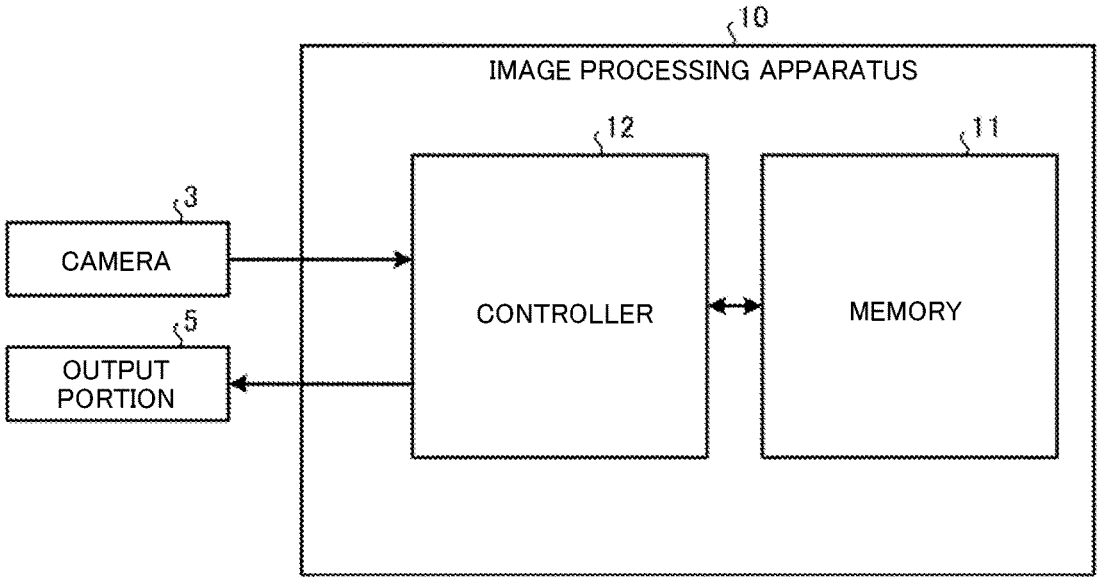
FIG. 3 is a block diagram illustrating a configuration example of an image processing apparatus.

Next, a configuration example of the image processing apparatus 10 using the image processing method according to the embodiment will be more specifically described with reference to FIG. 3. FIG. 3 is a block diagram illustrating a configuration example of the image processing apparatus 10 according to the embodiment. As illustrated in FIG. 3, the image processing apparatus 10 includes a memory 11 and the controller 12. The camera 3 and an output portion 5 are connected to the image processing apparatus 10.

The camera 3 is mounted in the vehicle V and provided to capture an image in front of the vehicle V. The camera 3 may be, for example, a 360-degree camera capable of capturing images all around the vehicle V.

The output portion 5 is an output device for outputting data. The output portion 5 is implemented by a display, a speaker, and the like. The output portion 5 may be an external device that performs information processing based on data output by the image processing apparatus 10.

The camera 3 and the output portion 5 are connected to the image processing apparatus 10 via an in-vehicle network, such as a CAN (Controller Area Network). The camera 3 and the output portion 5 may be connected to the image processing apparatus 10 via a Bluetooth (registered trademark), a Wi-Fi (registered trademark), a UWB (Ultra Wide Band), or the like, by using a wireless network.

The image processing apparatus 10 is a computer to be mounted in the vehicle V, for example, the device for determining whether or not the driver of the vehicle is ignoring the traffic light. The image processing apparatus 10 performs the processes of the steps S1 to S4 described with reference to FIG. 2.

The memory 11 is implemented by a storage device, such as a RAM (Random Access Memory) or a flash memory. The memory 11 stores an image recognition AI, processing parameter information, and the like.

The image recognition AI is an AI (Artificial Intelligence) model for the image recognition and the DNN (Deep Neural Network) model, etc. learned using a machine learning algorithm. When the camera image of the camera 3 is input, the image recognition AI detects the traffic lights 300 having various sizes included in the camera image.

The processing parameter information relates to various parameters to be used when determining the light emitting of the traffic light 300. Examples of the processing parameter information will be described later with reference to FIG. 8, etc.

The controller 12 is implemented by a CPU (central processing unit) or an MPU (micro processing unit) executing an image processing program according to the embodiment stored in the memory 11 with RAM as a work area. The controller 12 can be implemented by an integrated circuit, such as an ASIC (Application Specific Integrated Circuit or an FPGA (Field Programmable Gate Array).

The controller 12 performs various processes for determining the light emitting state of the traffic light 300 from the camera image captured by the camera 3. The controller 12 acquires the camera image captured by the camera 3, inputs the camera image to the image recognition AI that reads the camera image, and acquires a result of the image recognition that is output from the image recognition AI. The result of the image recognition includes the traffic light 300 identified as the rectangular region BB.

Figure 5:
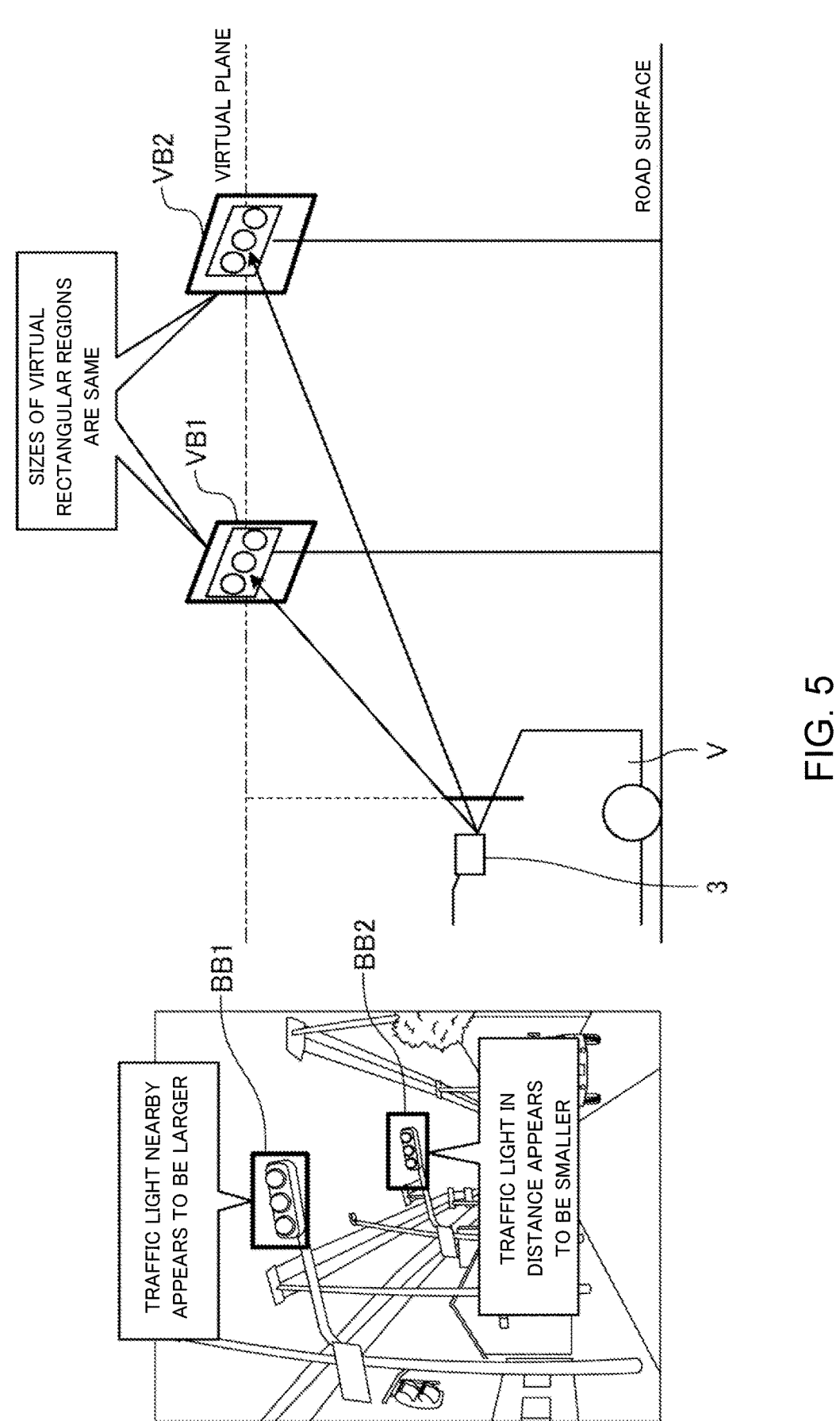
FIG. 5 is an explanatory diagram (No. 2) of the generation process of the virtual rectangular region.
Figure 6:
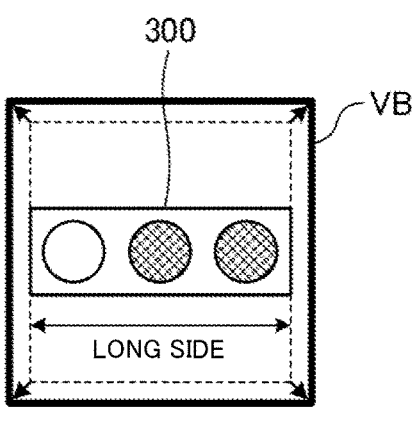
FIG. 6 is an explanatory diagram (No. 3) of the generation process of the virtual rectangular region.

Subsequently, the controller 12 performs a rectangle generation process based on the result of the image recognition. Here, the generation process of a virtual rectangular region performed by the controller 12 will be more specifically described with reference to FIG. 4 to FIG. 6. FIG. 4 is an explanatory diagram (No. 1) of the generation process of the virtual rectangular region. FIG. 5 is an explanatory diagram (No. 2) of the generation process of the virtual rectangular region. FIG. 6 is an explanatory diagram (No. 3) of the generation process of the virtual rectangular region.

The controller 12 converts center coordinates of the rectangular region BB to world coordinates, uses the world coordinates as a center point of the traffic light 300 on an actual space, and generates a rectangle with a fixed width in vertical and horizontal directions on the actual space from the center point as the virtual rectangular region.

Figure 4:
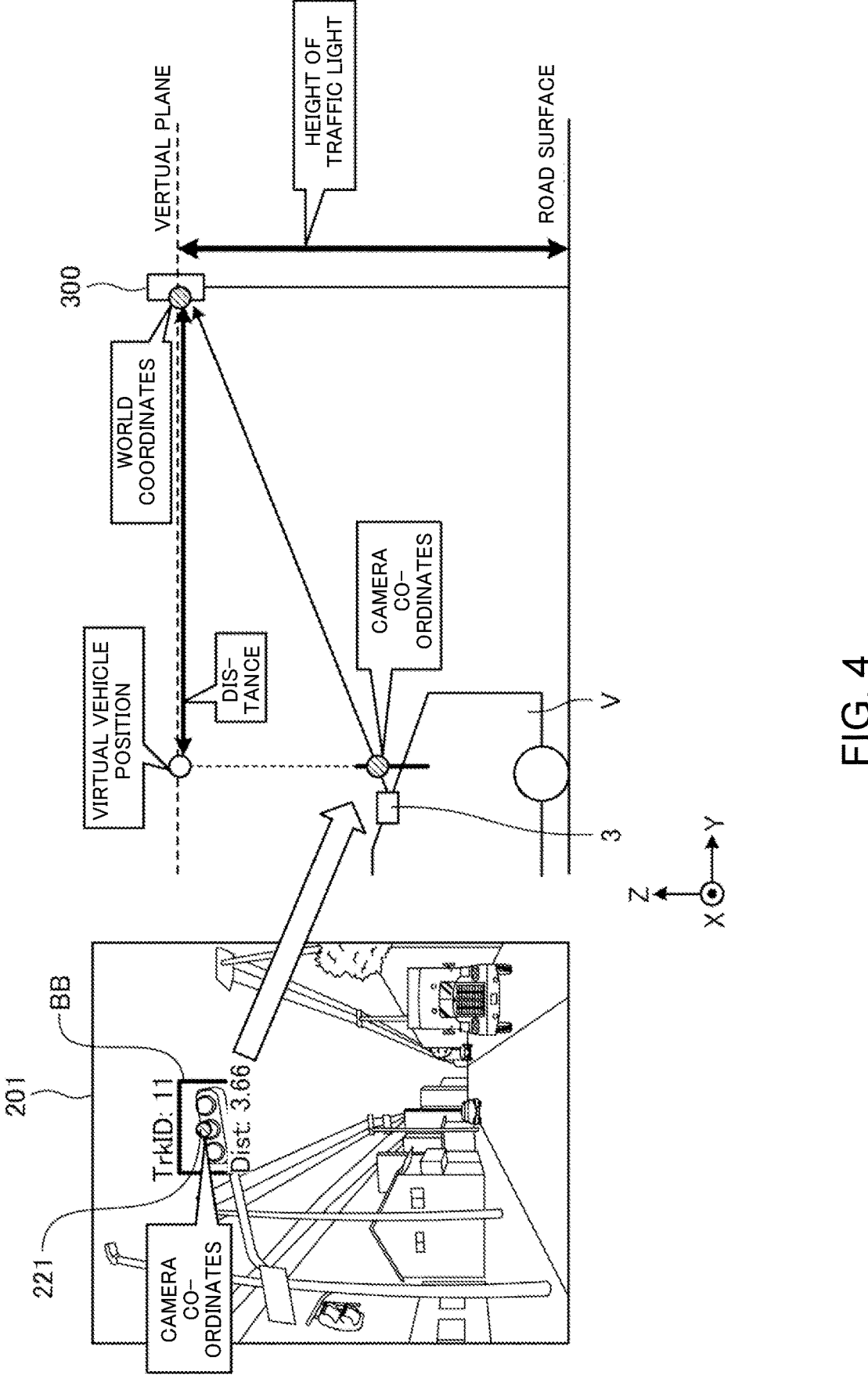
FIG. 4 is an explanatory diagram (No. 1) of a generation process of a virtual rectangular region.

As illustrated in FIG. 4, the controller 12 first assumes that a height of the traffic light 300 is the same to some extent and then converts camera coordinates indicating a center of the rectangular region BB to the world coordinates on a virtual plane assumed to be the height of the traffic light 300 using camera parameters.

Specifically, the controller 12 calculates a virtual vehicle position indicating a position at which a position of the vehicle V is projected on the virtual plane having the same height in a chronological space based on the rectangular region BB indicating a position of the traffic light 300 in an image 201 captured by the camera 3 of the vehicle V.

In a coordinate system expressed by three axes, including an axis in a vertical direction, which are orthogonal to each other, the controller 12 calculates the coordinates of the traffic light 300 on the virtual plane obtained by fixing a coordinate value of the axis in the vertical direction as the world coordinates.

As illustrated in FIG. 4, a position in the actual space is expressed by the coordinate values of an X-axis, a Y-axis, and a Z-axis. The X-axis, the Y-axis, and the Z-axis are orthogonal to each other. The Z-axis is the axis in the vertical direction. The Y-axis is parallel to a traveling direction of the vehicle V in FIG. 4. The X-axis is orthogonal to the Z-axis and the Y-axis.

Here, it is assumed that the center of the rectangular region BB is a center point 221. The controller 12 converts two-dimensional coordinates (camera coordinates) of the center point 221 in the image 201 to three-dimensional world coordinates using the camera parameters. A distance to the center point 221 in the world coordinates is calculated as a distance (Dist) between the vehicle V and the traffic light 300.

The camera parameters include internal and external parameters of the camera 3. The internal parameters include a dot pitch, a focal distance, a distortion (elevation angle image height TBL), and the like. The external parameters include coordinate values of the X-axis, the Y-axis, and the Z-axis in a shooting position of the camera 3 and values representing an attitude of the camera 3 (PAN, ROLL, TILT).

The controller 12 refers to the predetermined height of the traffic light 300 from a road surface as a different parameter from the camera parameters. The height of the traffic light 300 is, for example, determined in a range of 5.0 m to 5.5 m.

In this way, by converting to the world coordinates, there is an advantage that a distance to the traffic light 300 is calculated using a monocular camera at low cost.

The controller 12 uses the world coordinates as the center point of the traffic light 300 on the actual space, and generates a rectangle with a fixed width in vertical and horizontal directions on the actual space from the center point as a virtual rectangular region VB.

Thus, as illustrated in FIG. 5, in the case of the rectangular region BB, a rectangular region BB1 of the traffic light 300 nearby appears to be larger while a rectangular region BB2 of the traffic light 300 in the distance appears to be smaller. However, in the case of the virtual rectangular region VB, sizes of a virtual rectangular regions VB1 and VB2 are the same regardless of the distance to the traffic light 300.

The controller 12 determines the size of the virtual rectangular region VB based on standard size (1250 mm×450 mm) of the traffic light 300 on the actual space. In this embodiment, since the controller 12 determines both a horizontal traffic light and a vertical traffic light, as illustrated in FIG. 6, a square having a long side (i.e., 1250 mm, etc.) of the traffic light 300 on the actual space is used as a standard shape to generate the virtual rectangular region VB. As illustrated in FIG. 6, in order to correspond to variations in the size and position of the rectangular region BB to be input, the controller 12 uses the standard shape that has been expanded at a predetermined expansion rate (e.g., 1.1 times).

Figure 7:
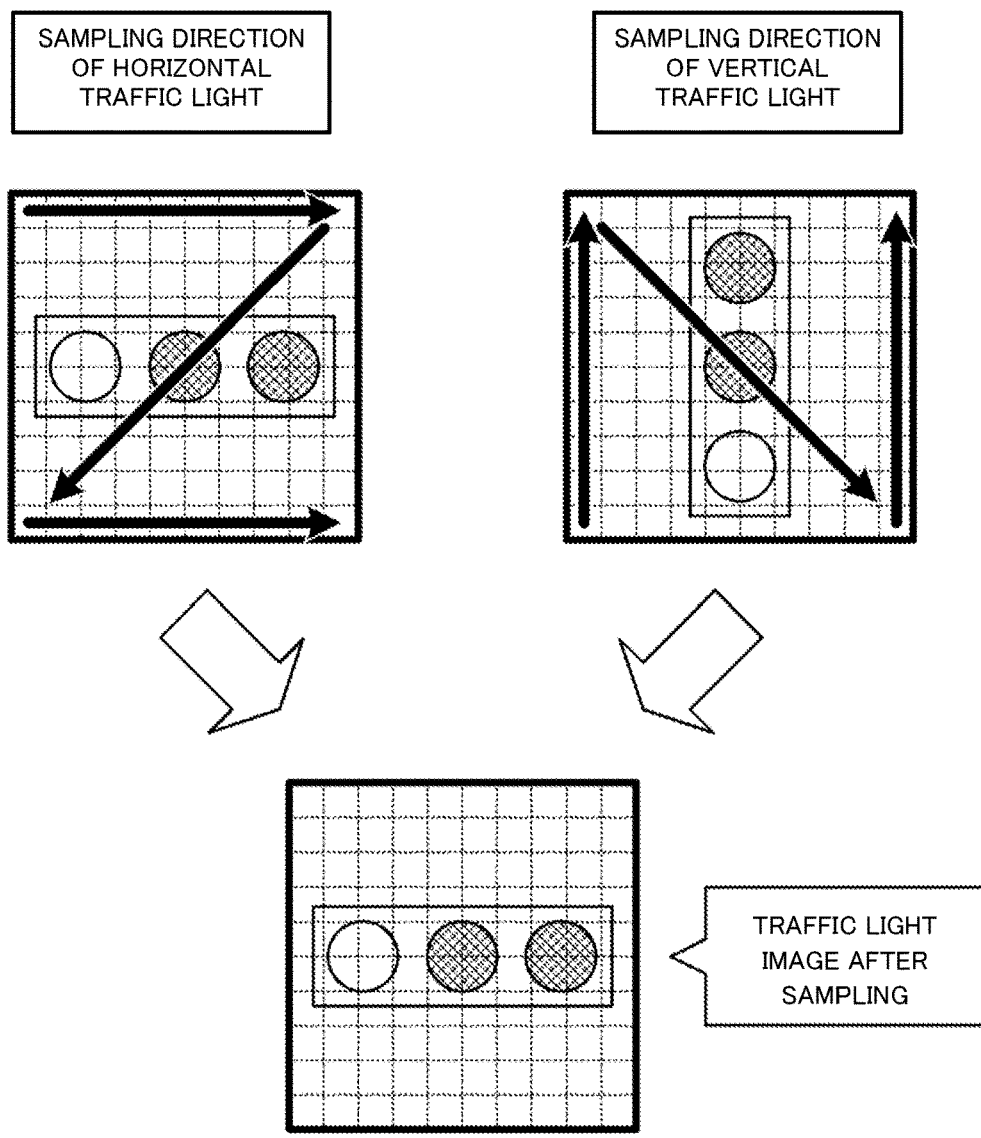
FIG. 7 is an explanatory diagram of a generation process of a traffic light image.

Subsequently, the controller 12 generates a traffic light image. FIG. 7 is an explanatory diagram of a generation process of the traffic light image. The controller 12 generates the traffic light image corresponding to the virtual rectangular region VB. As described above, the controller 12 generates the traffic light image by always sampling the virtual rectangular region VB as an image of the same size (e.g., 25×25 pixels) and referring to the pixels on the camera image corresponding to each sampling point.

By referring to the pixels on the camera image, an inverse conversion of the conversion from the camera coordinates to the world coordinates is performed. For a sampling direction, as illustrated in FIG. 7, the horizontal traffic light is scanned from the top left to the bottom right and the vertical traffic light is scanned from the bottom left to the top right. That is, the controller 12 generates the traffic light image by sampling in the sampling direction in which the pixels on the camera image are sequentially scanned along a longitudinal direction of the traffic light 300 in the camera image. Thus, the traffic light images after sampling are seen the same including a sense of scale and direction in the image, regardless of whether the traffic light is the horizontal traffic light or the vertical traffic light.

Therefore, the traffic lights 300 to be determined are always handled as image information of the same size, regardless of the size, position, and vertical or horizontal direction in the camera image. Thus, it is possible to contribute to suppress processing cost.

Furthermore, by reducing the size of the traffic light image (that is, increasing sampling intervals on the actual space), the processing cost in each process at the latter stage is reduced.

Subsequently, a color adjustment process performed by the controller 12 will be described. The controller 12 adjusts the traffic light image that has been generated to a predetermined color space in accordance with an extraction process of a color feature amount at the latter stage. In this embodiment, the controller 12 performs color space adjustment in a YUV format.

The controller 12 performs the color space adjustment in an HSV format in addition to the YUV format. The YUV format represents colors using Y (luminance), and an orthogonal coordinate system of U (difference between the luminance and the green component) and V (difference between the luminance and the red component). In the YUV format, although the colors may be difficult to be separated because rectangular representation of U and Vis used, the processing cost is low. On the other hand, the HSV represents colors using a polar coordinate system of H (respective color components) and S (saturation), and V (brightness). In the HSV format, although the colors are easier to be separated compared to the YUV format because fan-shaped representation of H and S is used, the processing cost is high.

In this embodiment, the processing cost is emphasized and the YUV format is used. However, the HSV format and other formats may be appropriately selected depending on the processing cost, such as a case in which calculation resources of the image processing apparatus 10 are acceptable.

Figure 9:
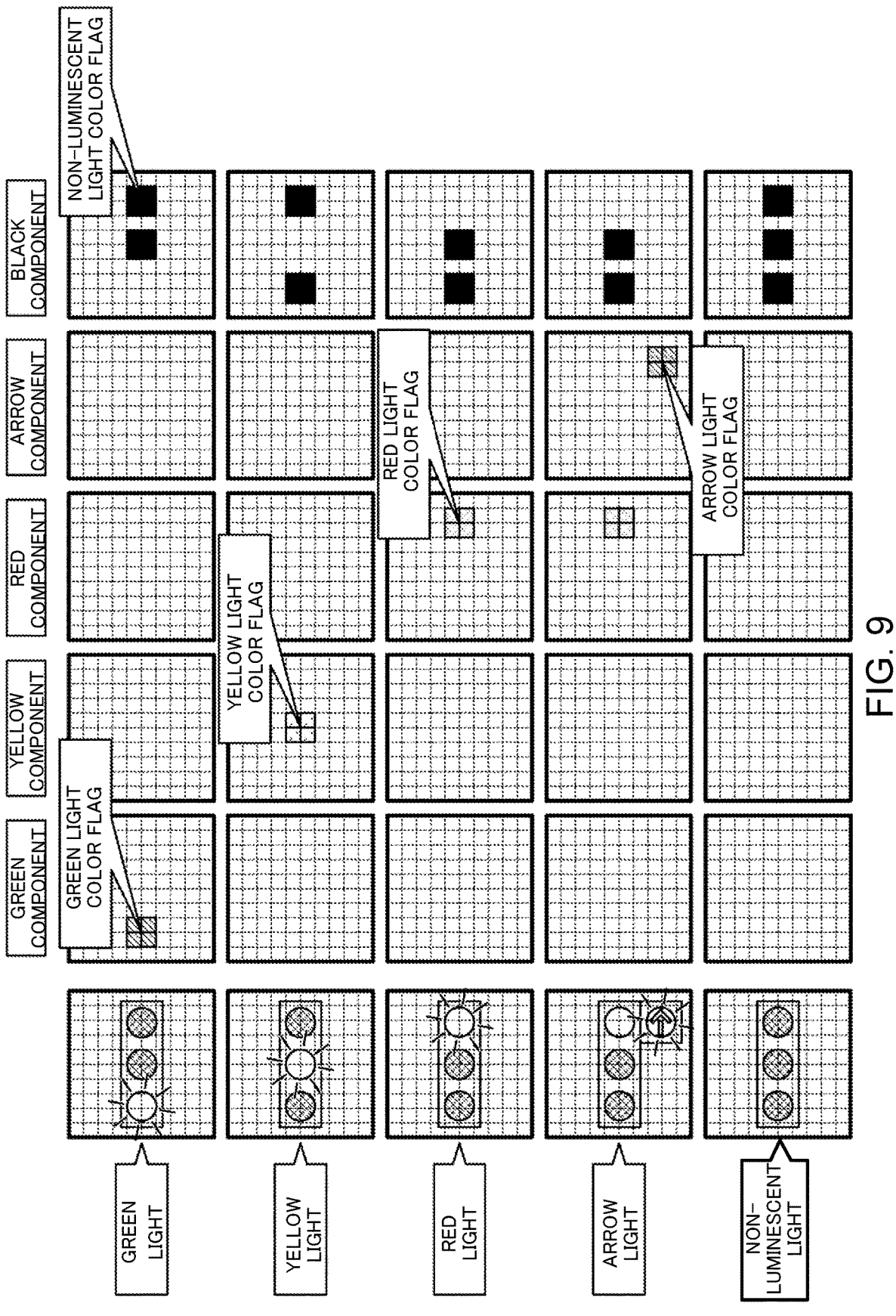
FIG. 9 is an explanatory diagram (No. 2) of the extraction process of the color feature amount.

Subsequently, a generation process of the color array performed by the controller 12 will be described. FIG. 8 is an explanatory diagram (No. 1) of the extraction process of the color feature amount. FIG. 9 is an explanatory diagram (No. 2) of the extraction process of the color feature amount.

The controller 12 inputs the traffic light image after the color space adjustment, and generates the color array by setting color flags corresponding to the respective color components to the pixels that satisfy applicable conditions of the respective color components of the traffic light 300 indicated by predetermined YUV threshold values.

Specifically, in the processing parameter information, as illustrated in FIG. 8, the applicable conditions for the pixels having the respective color components of green, yellow, red, and black of the traffic light 300 are specified by predetermined lower and upper limits of Y, U, and V.

The controller 12 extracts the pixels that satisfy the applicable conditions for the pixels having the respective color components of the traffic light 300 in the traffic light image after the color space adjustment. Then, the controller 12 sets the color flags corresponding to the pixels having the applicable color components for the extracted pixels.

For example, in the traffic light in which the green light is located on the left side, the yellow light in the center, the red light on the right side, and an arrow light below the red light, as illustrated in FIG. 9, in the case of the green light, at least in the traffic light image, the pixels that satisfy the applicable conditions of the pixels having the green component are extracted, and green light color flags are set. In the case of the yellow light, at least in the traffic light image, the pixels that satisfy the applicable conditions of the pixels having the yellow component are extracted, and yellow light color flags are set. In the case of the red light, at least in the traffic light image, the pixels that satisfy the applicable conditions of the pixels having the red component are extracted, and red light color flags are set. In the case of the arrow light, at least in the traffic light image, arrow light color flags are set. When all lights are non-luminescent lights that are tuned off, the respective pixels that satisfy the applicable conditions of the black component are extracted and non-luminescent color flags are set.

In any of the light emitting state of the traffic light 300, the respective pixels that satisfy the applicable conditions of the black component may be extracted and non-luminescent light color flags may be set. As described above, in the traffic light 300 that is exposed to the direct sunlight, the black component may not be detected, the non-luminescent color flags may not be set. Thus, the controller 12 may prevent the black component from being extracted in a stage of generating the color array.

Figure 10:
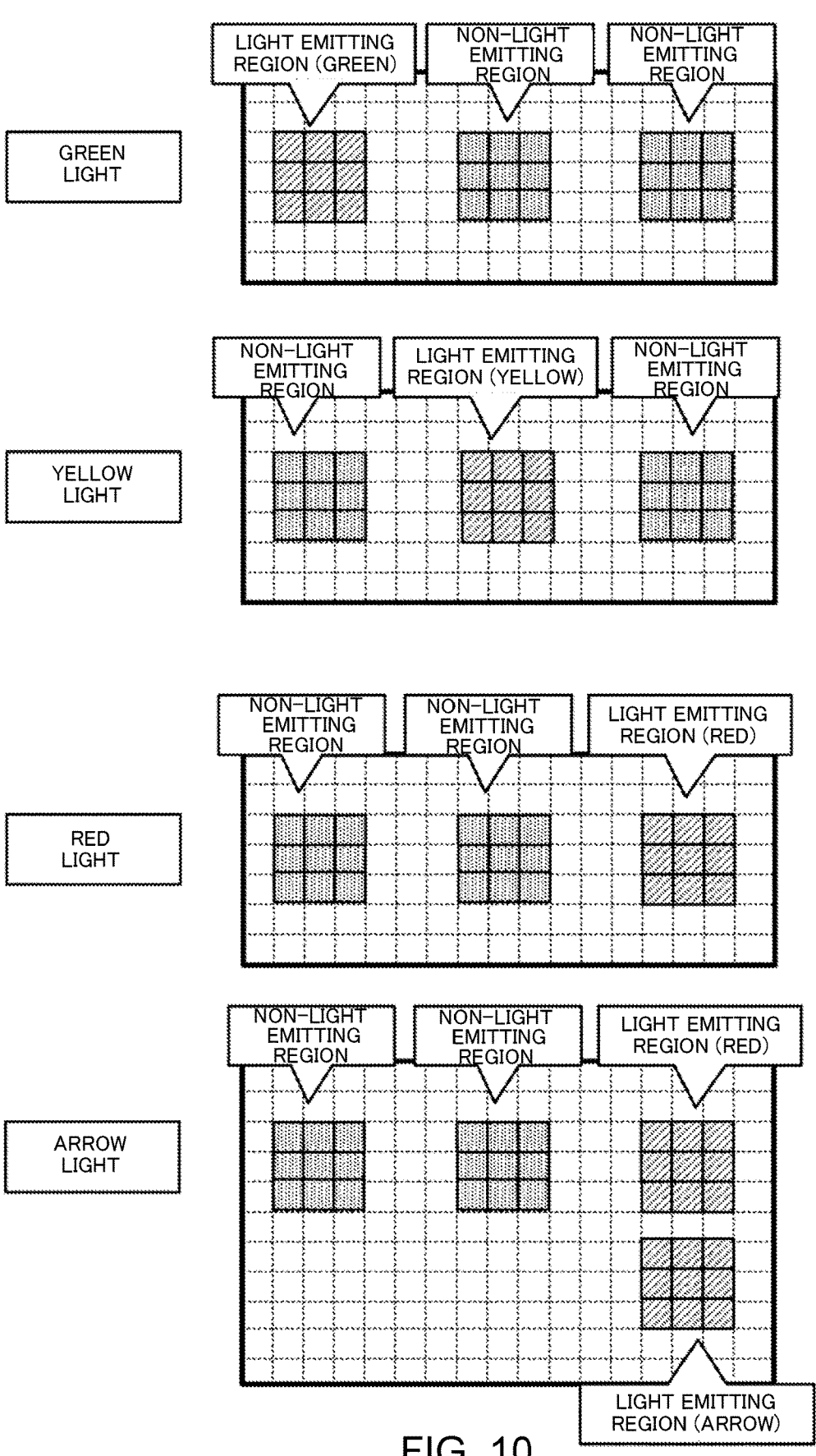
FIG. 10 illustrates one example of a detection filter.

Next, an identification process of the light emitting region and the non-light emitting region performed by the controller 12 will be described. The controller 12 identifies the light emitting region and the non-light emitting region from the generated color array using detection filters respectively corresponding to the respective color components of the respective lights of the traffic light 300. FIG. 10 illustrates one example of the detection filters.

As illustrated in FIG. 10, the detection filters identify a region whose position is determined depending on the color components of the light emitting region as the non-light emitting region, and represent an array of the respective lights of the traffic light 300. In each of the detection filters, the light emitting region and the non-light emitting region have 3×3 pixels, respectively. The respective regions are separated from each other by a fixed distance (e.g., three pixels).

As illustrated in FIG. 10, in the traffic light in which the green light is located on the left side, the yellow light in the center, the red light on the right side, and the arrow light below the red light, a detection filter of the green light specifies a positional relationship between the light emitting region and the non-light emitting regions in the order of a green light emitting region, a non-light emitting region, and a non-light emitting region from the left. A detection filter of the yellow light specifies the positional relationship between the light emitting region and the non-light emitting regions in the order of a non-light emitting region, a yellow light emitting region, and a non-light emitting region from the left. A detection filter of the red light specifies the positional relationship between the light emitting region and the non-light emitting regions in the order of a non-light emitting region, a non-light emitting region, and a red light emitting region from the left. A detection filter of the arrow light specifies the light emitting region and the non-light emitting regions in the same way as the detection filter of the red light, and further specifies a light emitting region of the arrow light below the red light emitting region.

In this way, by using the detection filters corresponding to the respective light emitting states of the traffic light 300, the controller 12 identifies a search area for the lights that are turned off based on the light that is turned on extractable when generating the color array.

Thus, when the traffic light 300 is exposed to the strong light, the controller 12 estimates a region in which the lights that are turned off and not extracted in the color array are reflected.

The controller 12 identifies the light emitting region and the non-light emitting regions from the traffic light image by filtering using the detection filters of the respective color components. When the light emitting region and the non-light emitting regions that have been extracted satisfy the following conditions (1) to (4), the controller 12 detects the pixels to be determined (hereinafter, referred to as "determination target pixels") as a light emitting surface that emits light of flag colors.

(1) Compare average luminance between the light emitting region and the non-light emitting regions and there is a difference equal to or greater than a fixed value.

(2) Compare average saturation between the light emitting region and the non-light emitting regions and there is a difference equal to or greater than a fixed value.

(3) A number of the pixels of the color components in the light emitting region exceeds a predetermined fixed threshold value.

(4) An average value of a color in the non-light emitting regions falls within a predetermined fixed range.

The conditions (1) and (2) relate to relative evaluation between the light emitting region and the non-light emitting regions, and the conditions (3) and (4) relate to absolute evaluation between the light emitting region and the non-light emitting regions.

By combining the relative evaluation and absolute evaluation, the controller 12 accurately determines the light emitting state of the traffic light 300. First, the conditions (1) and (2) out of the conditions (1) to (4) will be described.

Figure 11:
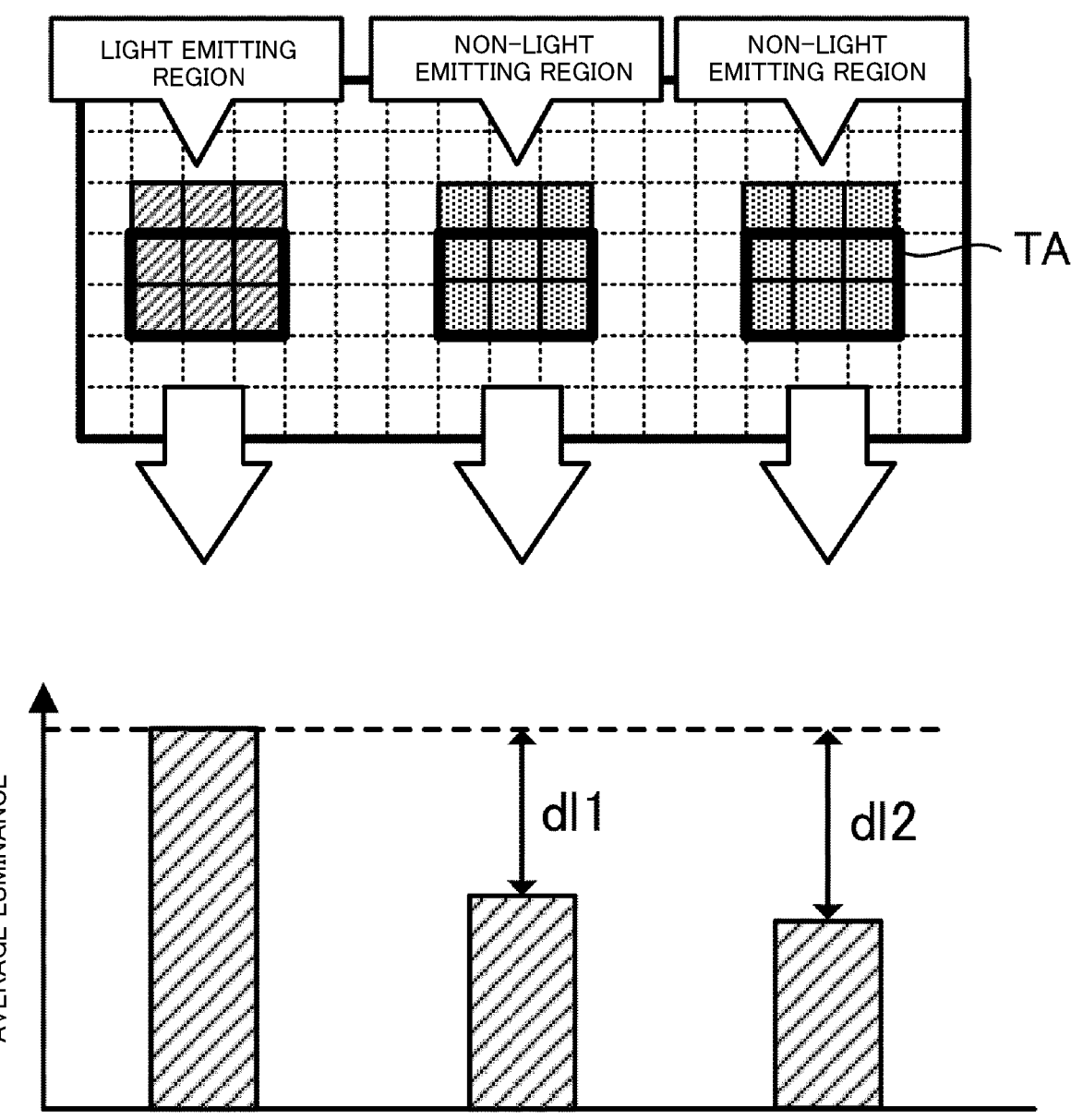
FIG. 11 is an explanatory diagram (No. 1) of relative comparison between a light emitting region and non-light emitting regions.
Figure 12:
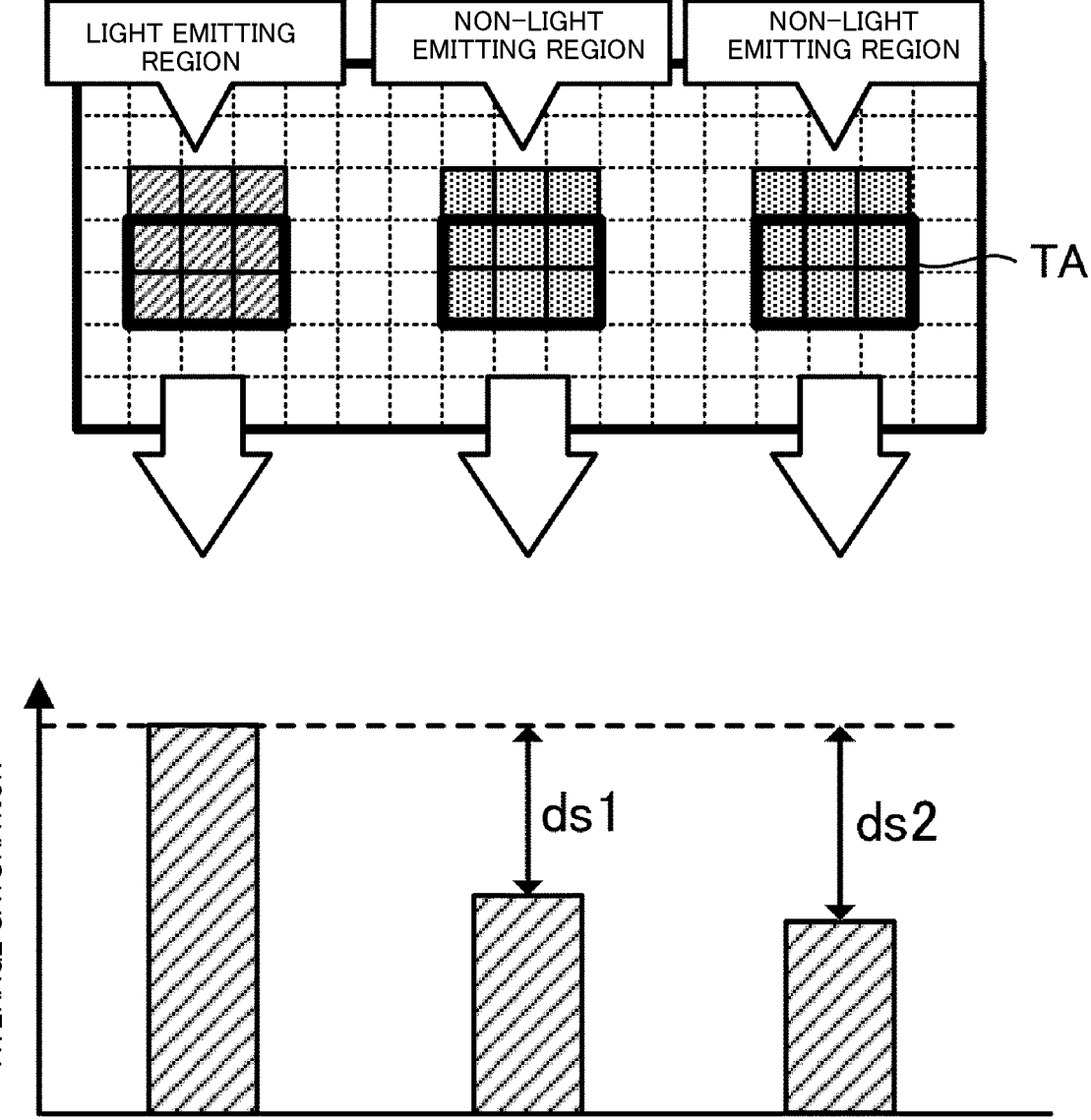
FIG. 12 is an explanatory diagram (No. 2) of the relative comparison between the light emitting region and the non-light emitting regions.

Each of FIG. 11 and FIG. 12 is a specific example of the relative comparison between the light emitting region and the non-light emitting regions. As illustrated in FIG. 11, the controller 12 compares the average luminance between the light emitting region and the non-light emitting regions. The controller 12 compares average luminance among target areas TA positioned on lower sides of the light emitting region and the non-light emitting regions.

The controller 12 determines whether or not the average luminance of each of the non-light emitting regions is not less than the fixed value relative to the average luminance of the light emitting region. The controller 12 determines whether or not differences dl1, dl2 between the average luminance of the light emitting region and the average luminance of each of the non-light emitting regions exceed the threshold value, respectively.

Furthermore, regarding the condition (2), as illustrated in FIG. 12, the controller 12 compares the average saturation between the light emitting region and the non-light emitting regions. The controller 12 determines whether or not the average saturation of each of the non-light emitting regions is not less than the fixed value relative to the average saturation of the light emitting region. The controller 12 determines whether or not differences ds1, ds2 between the average saturation of the light emitting region and the average saturation of each of the non-light emitting regions exceed the threshold value, respectively.

As a result of the relative comparison, the controller 12 detects the determination target pixels in the light emitting region as the light emitting surface under the condition that the average luminance of each of the non-light emitting regions is not less than the fixed value relative to the average luminance of the light emitting region, and the average saturation of each of the non-light emitting regions is not less than the fixed value relative to the average saturation of the light emitting region.

As a result of the relative comparison, when neither the condition of the average luminance nor the condition of the average saturation is not satisfied, the controller 12 does not detect the determination target pixels in the light emitting region as the light emitting surface.

Here, as the average luminance of the light emitting region is increased by the light intensity of the light that shines on the traffic light 300, the average luminance of the non-light emitting regions is relatively increased. Thus, by comparing the average luminance between the light emitting region and the non-light emitting regions, the controller 12 detects the lights of the traffic light 300 that are turned off and not detected as the non-luminescent light color flags (refer to FIG. 9)

In the condition (2), the controller 12 compares the average saturation between the light emitting region and the non-light emitting regions. This is because, when the light that is emitting light by itself appears more brightly than the light that is turned off, even when the strong light shines on the traffic light 300.

In addition to the average luminance of the light emitting region and the non-light emitting regions, by comparing the average saturation between the light emitting region and the non-light emitting regions, the controller 12 captures the difference of features between the light that is turned on and the light that is turned off, which is not captured only by the average luminance.

In this way, since the light emitting region and the non-light emitting regions are relatively compared, the controller 12 dynamically changes the threshold value for detecting the non-light emitting regions as the light that is turned off. More specifically, as the average luminance of the light emitting region increases, the threshold value of the average luminance relative to the non-light emitting regions increases. As the average saturation of the light emitting region increases, the threshold value of the average saturation relative to the non-light emitting regions increases.

As described above, since the light emitting region and the non-light emitting regions are relatively compared, the controller 12 accurately detects the lights that are turned off and not detected as the non-luminescent light color flags.

Subsequently, the conditions (3) and (4) will be described. The controller 12 determines whether or not the light emitting region and the non-light emitting regions respectively satisfy predetermined fixed conditions for the conditions (3) and (4).

In the condition (3), a fixed condition for the light emitting region is whether or not the number of the pixels of the color components detected in the light emitting region exceeds the threshold value. In the condition (4), a fixed condition for the non-light emitting regions is that the average value of the color in the non-light emitting regions falls within the predetermined fixed range.

The controller 12 counts the number of the pixels with the same color as that of the determination target pixels from the light emitting region. When the number of the pixels exceeds the threshold value, the controller 12 determines that the light emitting region satisfies the condition (3). When the number of the pixels does not exceed the threshold value, the controller 12 determines that the light emitting region does not satisfy the condition (3).

The controller 12 determines whether or not the average value of the color in the non-light emitting regions falls within the predetermined fixed range. When the average value falls within the range, the controller 12 determines that the non-light emitting regions satisfy the condition (4). When the average value falls out of the range, the non-light emitting regions do not satisfy the condition (4). The controller 12 calculates the average value of each parameter for YUV of each pixel included in the non-light emitting regions, and determines whether the calculated average value falls within or out of the range.

In the condition (3), since the controller 12 counts the number of the pixels with the same color as that of the determination target pixels from the light emitting region, the controller 12 eliminates the determination target pixels as noises. Furthermore, in the condition (4), since the controller 12 looks at the average value of the color in the non-light emitting regions, the controller 12 suppresses erroneous detection that the region in which the light that is turned on is determined to be the region in which the lights that are turned off.

That is, by performing the absolute evaluation for the light emitting region and the non-light emitting regions, the controller 12 accurately detects the traffic light 300.

When the controller 12 determines the conditions (1) to (4) for the color array, and all of the conditions are satisfied, the controller 12 detects the determination target pixels as the light emitting surface that is emitting light of the corresponding flag color. That is, when the light emitting region satisfies the condition for the light that is turned on and the non-light emitting regions satisfy the condition for the light that is turned off, the controller 12 detects the determination target pixels as the light emitting surface.

Then, after a determination process for all the determination target pixels is terminated, the controller 12 determines that the light with the highest color component, which has been detected as the light emitting surface, is emitting light. As a result, since the controller 12 eliminates the determination target pixels that happen to satisfy the conditions as noises, the controller 12 suppresses an erroneous determination of the light emitting state of the traffic light 300.

At this time, the controller 12 may determine the light emitting state of the traffic light 300 based on information of a plurality of frames. For example, when the controller 12 has determined that it is continuously in the same light emitting state in the plurality of the frames, the controller 12 confirms the light emitting state.

The controller 12 may determine the light emitting state from a transition of the light emitting state in the plurality of the frames. Generally, the light emitting state of the traffic light regularly changes, such as a change from the green light to the yellow light. The controller 12 confirms the determination of the light emitting state depending on whether or not the light emitting state that has been determined according to regularity of the traffic light makes a transition.

In this way, the controller 12 accurately performs the determination of the light emitting state by determining the light emitting state using the information of the plurality of the frames.

Subsequently, processes related to the motion estimation in the step S3 and the determination of whether or not the driver of the vehicle is ignoring the traffic light in the step S4 illustrated in FIG. 2 will be described. In the motion estimation, the controller 12 estimates a behavior of the vehicle V based on a trajectory of each object recognized by the image recognition.

In the determination of whether or not the driver of the vehicle is ignoring the traffic light, first, the controller 12 estimates a relative trajectory of the traffic light 300 relative to the vehicle V based on the traffic light 300 recognized by the image recognition and the distance to the traffic light 300.

Although the traffic light 300 that presents priority of traffic in the traveling direction of the vehicle V is the red light, when the vehicle V continues to travel for a predetermined time or longer and at a predetermined speed or faster, the controller 12 determines that the driver of the vehicle V has ignored the traffic light. The controller 12 outputs the determination result to the output portion 5.

When the image processing apparatus 10 constitutes a part of functions of the drive recorder, the controller 12 may notify the determination result that the driver of the vehicle V has ignored the traffic light as an event and cause the drive recorder to record the event.

Figure 13:
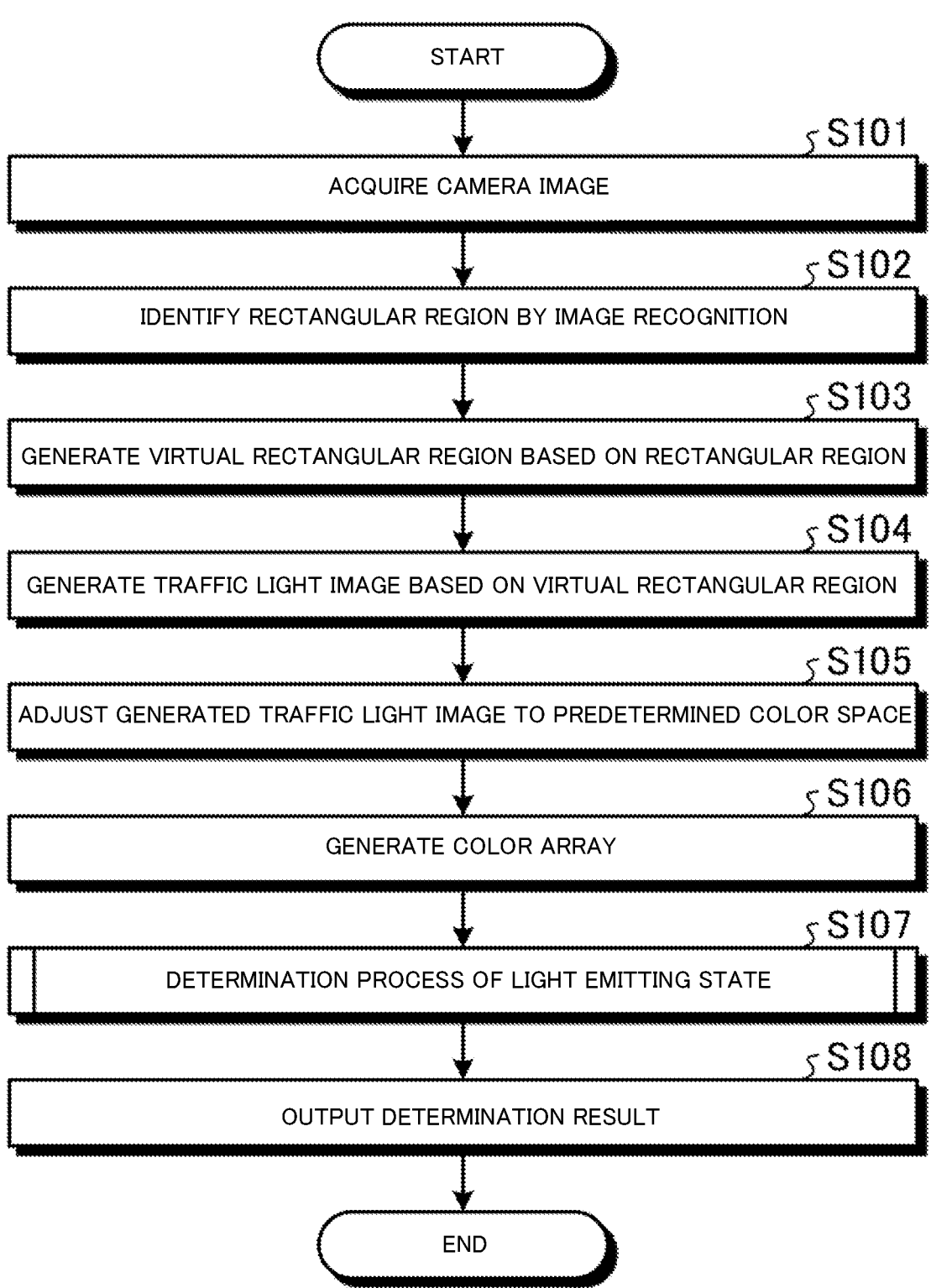
FIG. 13 is a flowchart illustrating a processing procedure executed by the image processing apparatus.

Next, a processing procedure executed by the image processing apparatus 10 according to the embodiment will be described with reference to FIG. 13 and FIG. 14. FIG. 13 is a flowchart illustrating the processing procedure executed by the image processing apparatus 10. The processing procedure illustrated in FIG. 13 is repeated by the controller 12 when the vehicle V is being started.

As illustrated in FIG. 13, the controller 12 of the image processing apparatus 10 acquires the camera image from the camera 3 (a step S101). The controller 12 identifies the rectangular region BB of the traffic light 300 by the image recognition of the acquired camera image (a step S102).

The controller 12 generates the virtual rectangular region VB based on the rectangular region BB (a step S103), and generates the traffic light image based on the virtual rectangular region VB (a step S104).

The controller 12 adjusts the generated traffic light image to the predetermined color space (a step S105), and generates the color array from the traffic light image after the color space adjustment (a step S106). The generation of the color array is performed by setting the flags the respective color components to the pixels that satisfy the applicable conditions for the respective color components of green, yellow, red, and black of the traffic light 300.

The controller 12 performs the determination process of the light emitting state of the traffic light 300 based on the generated color array (a step S107). The processing procedure of the determination process of the light emitting state will be described with reference to FIG. 14. Then, the controller 12 outputs the determination result (a step S108), and ends the process.

Next, a processing procedure related to the determination process of the light emitting state executed by the image processing apparatus 10 will be described with reference to FIG. 14. FIG. 14 is a flowchart illustrating the processing procedure of the determination process of the light emitting state.

Figure 14:
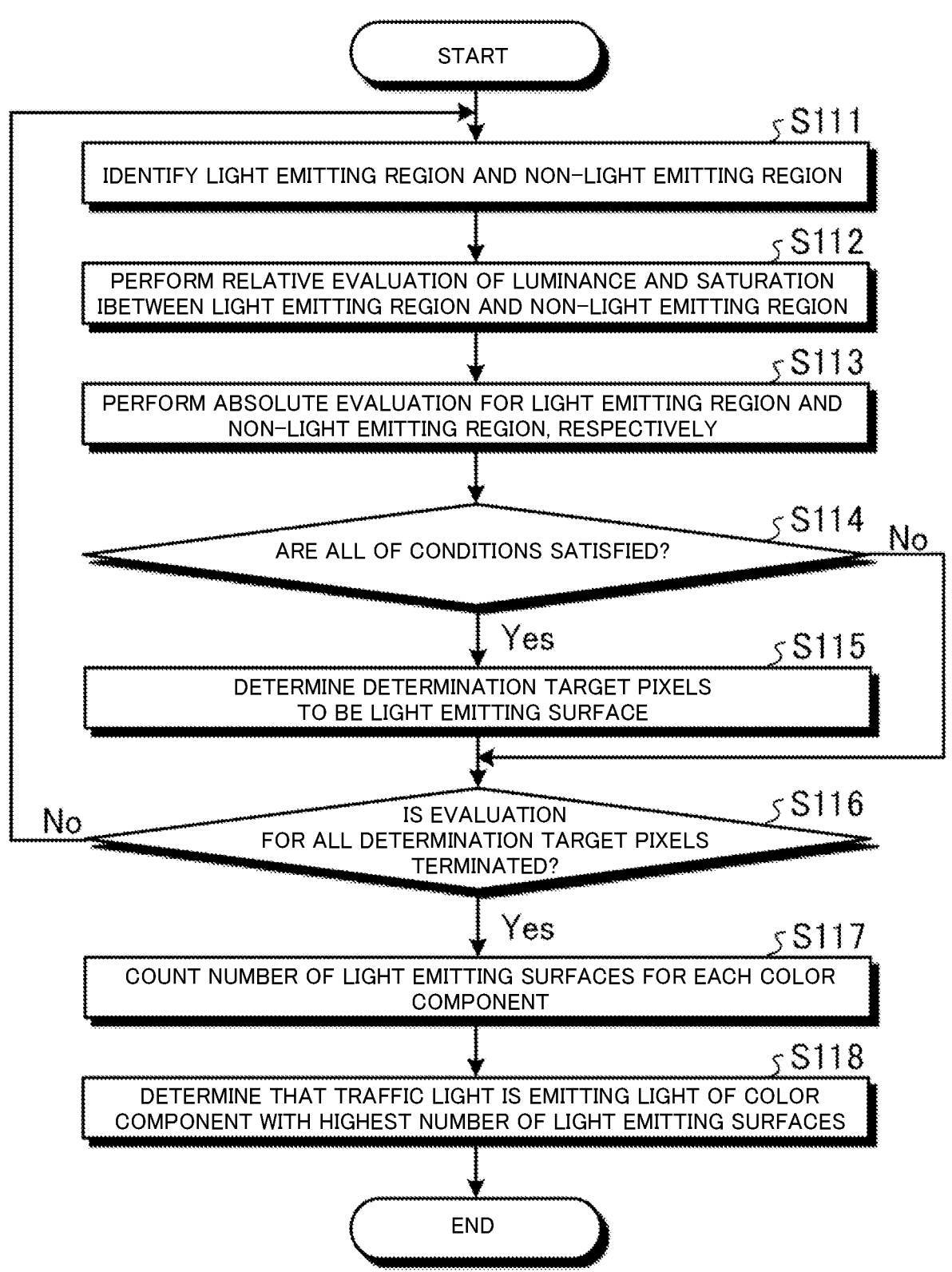
FIG. 14 is a flowchart illustrating a processing procedure of a determination process of a light emitting state.

As illustrated in FIG. 14, first, the controller 12 identifies the light emitting region and the non-light emitting regions from the color array (a step S111). The identification of the light emitting region and the non-light emitting regions is performed by scanning on the color array using the respective detection filters (refer to FIG. 10).

Subsequently, the controller 12 performs the relative evaluation of the luminance and saturation between the light emitting region and the non-light emitting regions based on the above conditions (1) and (2) (a step S112). The relative evaluation is performed by determining whether or not the difference of the average luminance between the light emitting region and the non-light emitting regions is equal to or greater than the fixed value, and whether or not the difference of the average saturation between the light emitting region and the non-light emitting regions is equal to or greater than the fixed value.

Subsequently, the controller 12 performs the absolute evaluation for the light emitting region and the non-light emitting regions based on the above conditions (3) and (4), respectively (a step S113). The absolute evaluation is performed by counting the number of the pixels of the color components in the light emitting region and determining whether or not the average value of the color in the non-light emitting regions falls within the range.

Based on processing results up to the step S113, the controller 12 determines whether or not all of the above conditions (1) to (4) are satisfied (a step S114). When the controller 12 has determined that all of the conditions are satisfied (Yes in the step S114), the controller 12 determines the determination target pixels to be the light emitting surface (a step S115).

When the controller 12 has determined that any of the conditions is not satisfied (No in the step S114), the controller 12 moves the process to a step S116. Subsequently, the controller 12 determines whether or not the evaluation for all the determination target pixels is terminated (the step S116).

When the evaluation for all the determination target pixels is terminated (Yes in the step S116), the controller 12 moves the process to a step S117. When the evaluation for all the determination target pixels is not terminated (No in the step S116), the controller 12 moves the process to the step S111. At this time, in the step S111, the controller 12 starts the process for the determination target pixels that has not been evaluated.

Subsequently, the controller 12 counts a number of the light emitting surfaces for each color component (the step S117), and determines that the traffic light 300 is emitting light of the color component with the highest number of the light emitting surfaces (a step S118). Then, the controller 12 ends the process.

As described above, the image processing apparatus 10 according to the embodiment includes the controller that determines the light emitting state of the traffic light from the camera image. The controller identifies the light emitting region and the non-light emitting regions of the traffic light from the camera image by the detection filers that detect the respective color components of the respective lights of the traffic light based on the predetermined threshold value. Then, the controller determines the light emitting state of the traffic light according to the results of the relative comparison of the luminance and saturation between the light emitting region and the non-light emitting regions that have been identified.

In this way, since the image processing apparatus 10 according to the embodiment detects the light that is turned off from the camera image by performing the relative comparison between the light emitting region and the non-light emitting regions, the image processing apparatus 10 according to the embodiment determines the light emitting state of the traffic light that is exposed to the strong light.

In the embodiment described above, although the determination of the light emitting state of the traffic light 300 and the determination of whether or not the driver of the vehicle is ignoring the traffic light are made based on the image recognition, these determinations may be made by appropriately combining the image recognition with sensor data of various sensors mounted in the vehicle V. The behavior of the vehicle V may be estimated by using sensor values of a steering sensor and an acceleration sensor. An own vehicle speed may be acquired by using a sensor value of a speed sensor.

It is possible for a person skilled in the art to easily come up with more effects and modifications. Thus, a broader modification of this invention is not limited to specific description and typical embodiments described and expressed above. Therefore, various modifications are possible without departing from the general spirit and scope of the invention defined by claims attached and equivalents thereof.

While the invention has been shown and described in detail, the foregoing description is in all aspects illustrative and not restrictive. It is therefore understood that numerous other modifications and variations can be devised without departing from the scope of the invention.

What is claimed is:

1. An in-vehicle apparatus mounted in a vehicle and comprising:

a camera positioned on the vehicle to capture an image of a scene in front of the vehicle, and a controller including a memory and a processor, the processor configured to identify a light emitting state of a traffic light having a green light, a yellow light and a red light from the image captured by the camera, the light emitting state being one of green, yellow and red, the processor configured to:

(i) perform image recognition of the image captured by the camera to generate a traffic light image of the traffic light in the camera image;

(ii) detect, from the traffic light image, each of green pixels, yellow pixels, and red pixels of the green, yellow and red lights of the traffic light based on predetermined threshold ranges for each of green, yellow and red color components;

(iii) identify a light emitting region and a plurality of non-light emitting regions from the green pixels, the yellow pixels and the red pixels that have been detected by scanning the traffic light image with a detection filter defining (1) a light-emitting region and (2) a plurality of non-light-emitting regions at predetermined relative positions corresponding to an arrangement of the green, yellow and red lights in the traffic light;

(iv) calculate an average luminance and an average saturation of the light-emitting region and of the plurality of non-light-emitting regions;

(v) determine the light-emitting region corresponds to a light, of the green, yellow and red lights of the traffic light, that is emitting light when:

differences between the average luminance of the light-emitting region and each of the non-light-emitting regions exceed a first threshold;

differences between the average luminance of the light-emitting region and each of the non-light-emitting regions exceed a second threshold;

a number of pixels in the light-emitting region satisfying a color condition exceeds a predetermined count threshold; and an average color value of each of the non-light-emitting regions falls within a predetermined range; and (vi) determine the light emitting state of the traffic light based on a color corresponding to the light of the light emitting region.

2. The in-vehicle apparatus according to claim 1, wherein the processor is configured to identify positions of the non-light emitting regions depending on the green pixels, the yellow pixels, and the red pixels in the light-emitting region that has been identified.

3. The in-vehicle apparatus according to claim 1, wherein the processor is configured to perform a color space adjustment on the image captured by the camera in a YUV format, and the differences between the average luminance and the differences between the average saturation of the light emitting region and each of the non-light emitting regions are determined after the color space adjustment has been performed.

4. The in-vehicle apparatus according to claim 1, wherein the light emitting state is determined based on information of a plurality of frames in the image captured by the camera.

5. An image processing method that determines a light emitting state of a traffic light having a green light, a yellow light and a red light from an image captured by a camera of an in-vehicle apparatus that is mounted in a vehicle, the image captured by the camera being of a scene in front of the vehicle, the method being executed by a processor of the in-vehicle apparatus and comprising the steps of:

(i) preforming image recognition of the image captured by the camera to generate a traffic light image of the traffic light in the camera image;

(ii) detecting, from the traffic light image, each of green pixels, yellow pixels, and red pixels of the green, yellow and red lights of the traffic light based on predetermined threshold ranges for each of green, yellow and red color components;

(iii) identifying a light emitting region and a plurality of non-light emitting regions from the green pixels, the yellow pixels and the red pixels that have been detected by scanning the traffic light image with a detection filter defining (1) a light-emitting region and (2) a plurality of non-light-emitting regions at a predetermined relative positions corresponding to an arrangement of the green, yellow and red lights in the traffic light;

(iv) calculating an average luminance and an average saturation of the light-emitting region and of the plurality of non-light-emitting regions;

(v) determining that the light-emitting region corresponds to a light, of the green, yellow and red lights of the traffic light, that is emitting light when:

differences between the average luminance of the light-emitting region and each of the non-light-emitting regions exceed a first threshold;

differences between the average luminance of the light-emitting region and each of the non-light-emitting regions exceed a second threshold;

a number of pixels in the light-emitting region satisfying a color condition exceeds a predetermined count threshold; and an average color value of each of the non-light-emitting regions falls within a predetermined range; and (vi) determining the light emitting stat of the traffic light based on a color corresponding to the light of the light emitting region.

6. A non-transitory computer-readable recording medium having stored therein a program that causes a computer of an in-vehicle apparatus mounted in a vehicle to execute a process that determines a light emitting state of a traffic light having a green light, a yellow light and a red light from an image captured by a camera of the in-vehicle apparatus, the image captured by the camera being of a scene in front of the vehicle, the process comprising:

(i) performing image recognition of the image captured by the camera to generate a traffic light image of the traffic light in the camera image;

(ii) detecting, from the traffic light image, each of green pixels, yellow pixels, and red pixels of the green, yellow and red lights of the traffic light based on predetermined threshold ranges for each of green, yellow and red color components;

(iii) identifying a light emitting region and a plurality of non-light emitting regions from the green pixels, the yellow pixels and the red pixels that have been detected by scanning the traffic light image with a detection filter defining (1) a light-emitting region and (2) a plurality of non-light-emitting regions at a predetermined relative positions corresponding to an arrangement of the green, yellow and red lights in the traffic light;

(iv) calculating an average luminance and an average saturation of the light-emitting region and of the plurality of non-light-emitting regions;

(v) determining that the light-emitting region corresponds to a light, of the green, yellow and red lights of the traffic light, that is emitting light when:

differences between the average luminance of the light-emitting region and each of the non-light-emitting regions exceed a first threshold;

differences between the average luminance of the light-emitting region and each of the non-light-emitting regions exceed a second threshold;

a number of pixels in the light-emitting region satisfying a color condition exceeds a predetermined count threshold; and an average color value of each of the non-light-emitting regions falls within a predetermined range; and (vi) determining the light emitting stat of the traffic light based on a color corresponding to the light of the light emitting region.

* * * * *